(12) United States Patent
Hare

(10) Patent No.: US 9,874,231 B2
(45) Date of Patent: Jan. 23, 2018

(54) HYDRAULIC ACTUATORS

(71) Applicant: BAE SYSTEMS PLC, London (GB)

(72) Inventor: Colin Hare, Preston (GB)

(73) Assignee: BAE SYSTEMS PLC, London (GB)

( * ) Notice: Subject to any disclaimer, the term of this patent is extended or adjusted under 35 U.S.C. 154(b) by 219 days.

(21) Appl. No.: 14/995,391

(22) Filed: Jan. 14, 2016

(65) Prior Publication Data

US 2016/0208824 A1    Jul. 21, 2016

(30) Foreign Application Priority Data

Jan. 14, 2015   (GB) .................................. 1500553.1

(51) Int. Cl.
| | |
|---|---|
| F15B 1/027 | (2006.01) |
| F15B 1/033 | (2006.01) |
| F15B 7/00 | (2006.01) |
| F15B 1/08 | (2006.01) |
| F15B 11/08 | (2006.01) |

(52) U.S. Cl.
CPC .............. *F15B 1/027* (2013.01); *F15B 1/033* (2013.01); *F15B 1/08* (2013.01); *F15B 7/00* (2013.01); *F15B 11/08* (2013.01); *F15B 2201/00* (2013.01); *F15B 2211/212* (2013.01); *F15B 2211/625* (2013.01); *F15B 2211/7053* (2013.01)

(58) Field of Classification Search
CPC .. F15B 1/027; F15B 1/033; F15B 1/08; F15B 7/00
USPC .......................................................... 60/413
See application file for complete search history.

(56) References Cited

U.S. PATENT DOCUMENTS

| | | | |
|---|---|---|---|
| 2003/0188529 A1 | 10/2003 | Collet | |
| 2006/0070378 A1* | 4/2006 | Geiger | .................... B29C 45/67 |
| | | | 60/475 |

(Continued)

FOREIGN PATENT DOCUMENTS

| | | |
|---|---|---|
| DE | 3133411 A1 | 4/1983 |
| EP | 2698545 A2 | 2/2014 |

(Continued)

OTHER PUBLICATIONS

GB Search Report of Appl No. GB1500553.1 dated Jun. 16, 2016.
EP Search Report of Appl No. 15275009 dated Jul. 20, 2015.

*Primary Examiner* — Michael Leslie
*Assistant Examiner* — Daniel Collins
(74) *Attorney, Agent, or Firm* — Marine Cernota & Rardin

(57) ABSTRACT

A hydraulic charging and driving system (4), aircraft employing the same, and corresponding methods, for extending and retracting a hydraulic actuator (2), comprising: a motor assembly (22); and an accumulator assembly (20), the motor assembly (22) and the accumulator assembly (20) being hydraulically coupled to each other; wherein the motor assembly (22) is arranged to recharge the accumulator assembly (20) with hydraulic fluid at a relatively slow rate that is slower than the rate at which the accumulator assembly (20) is arranged to discharge when actuating the hydraulic actuator (2). The system may further comprise a selector valve (24). The accumulator assembly (20) may comprise an accumulator chamber (30), and a compression means (32) provided within the accumulator chamber (30). The motor assembly (22) may comprise a motor (42) arranged to vary a volume of a hydraulic charging chamber (38) of the motor assembly (22).

15 Claims, 11 Drawing Sheets

(56) References Cited

U.S. PATENT DOCUMENTS

2011/0278068 A1 11/2011 Law et al.
2014/0060031 A1 3/2014 Cesur et al.
2014/0325972 A1 11/2014 Ma et al.

FOREIGN PATENT DOCUMENTS

GB 773755 A 5/1957
WO 20150023725 A1 2/2015

* cited by examiner

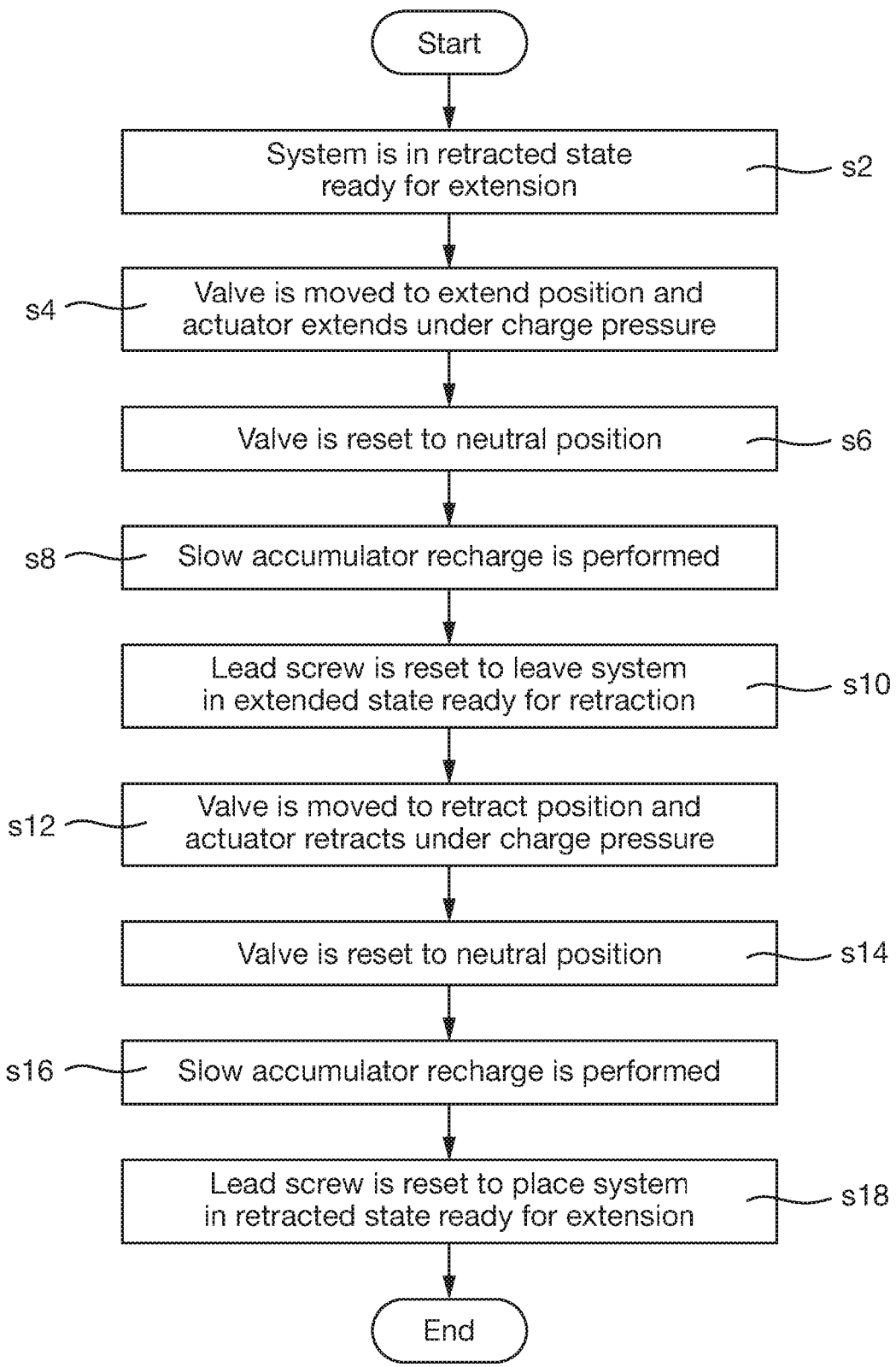

HYDRAULIC ACTUATORS

RELATED APPLICATIONS

This application is a U.S. National Application which claims priority to GB Patent Application 1500553.1 filed Jan. 14, 2015. This application is herein incorporated by reference in its entirety for all purposes.

FIELD OF THE INVENTION

The present invention relates to hydraulic actuators and hydraulic actuator systems. The present invention relates in particular to, but is not limited to, hydraulic actuators and hydraulic actuator systems for aircraft.

BACKGROUND

The use of hydraulic actuators, for example in aircraft, is well established. For example, they are used for flight control applications such as moving control flaps, for landing gear extension and retraction, and so on.

Conventionally, a plurality of actuators are coupled to a common hydraulic circuit that comprises a reservoir and a pump. An advantage of hydraulic actuators is the ability to provide a relatively high power density.

A disadvantage of the above described arrangements is that servicing or replacement of individual actuators can be relatively complex due to the possibility of requiring to bleed, flush and replenish the whole hydraulic circuit.

SUMMARY OF THE INVENTION

The present inventor has realised that it is desirable to use plural self-contained or closed hydraulic systems on a vehicle, in particular an aircraft, to achieve for example an advantage that each can be serviced or replaced independently of the others, thereby avoiding for example the need to drain a shared hydraulic system. The present inventor has realised that such an arrangement tends to have a disadvantage that high gearing or other measures are required for pumps to enable high power density to be provided, as is required for many applications on e.g. an aircraft. The present inventor has further realised however that in many applications, although a relatively high power density is required or desirable, this does not need to be continually available.

In a first aspect, the invention provides a hydraulic charging and driving system for extending and retracting a hydraulic actuator, comprising: a motor assembly, the motor assembly comprising a motor, a piston and a charging chamber; an accumulator assembly comprising an accumulator chamber; the charging chamber and the accumulator chamber being hydraulically coupled to each other; and a selector valve; wherein the motor assembly is arranged to recharge the accumulator assembly with hydraulic fluid by the motor moving the piston to eject the hydraulic fluid from the charging chamber of the motor assembly into the accumulator chamber of the accumulator assembly; the accumulator assembly and the selector valve are arranged such that hydraulic fluid in the accumulator chamber discharges via the selector valve into the hydraulic actuator to provide at least a part of an actuation of the hydraulic actuator responsive to the selector valve being switched; and the recharging of the accumulator assembly is performed at a relatively slow rate that is slower than the rate at which the accumulator assembly is arranged to discharge when providing the at least part of the actuation of the hydraulic actuator.

The charging chamber of the motor assembly may be a cylinder.

The accumulator assembly may comprise a compression means provided within the accumulator chamber.

The system may further comprise a hydraulic actuator comprising a bottom chamber and a piston-side chamber, wherein the accumulator assembly may be hydraulically coupled to the bottom chamber via a first setting of the selector valve to provide extension of the hydraulic actuator.

The accumulator assembly may further be hydraulically coupled to the piston-side chamber, in addition to being hydraulically coupled to the bottom chamber, via the first setting of the selector valve to provide extension of the hydraulic actuator.

The piston-side chamber may be hydraulically coupled to the motor assembly via a further setting of the selector valve to provide retraction of the hydraulic actuator.

The whole of the actuation of the hydraulic actuator may be provided by the discharge of the hydraulic fluid from the accumulator chamber via the selector valve to the hydraulic actuator.

The system may further comprise an emergency assembly arranged to provide at least emergency extension of the hydraulic actuator.

In a further aspect, the invention provides an aircraft comprising a plurality of separate hydraulic charging and driving systems according to any of the above aspects, each of the systems providing independent operation to a respective different movable part of the aircraft.

In a further aspect, the invention provides a method of operating a hydraulic system comprising a hydraulic actuator, a selector valve, a motor assembly, and an accumulator assembly hydraulically coupled in a hydraulic circuit, the motor assembly comprising a motor, a piston and a charging chamber, the accumulator assembly comprising an accumulator chamber, the charging chamber and the accumulator chamber being hydraulically coupled to each other via a part of the hydraulic circuit; the method comprising: hydraulically extending the hydraulic actuator, the hydraulic extension being provided at least in part by hydraulic fluid being discharged from the accumulator chamber via the selector valve to the hydraulic actuator responsive to the selector valve being switched; and thereafter, recharging the accumulator assembly with hydraulic fluid at a relatively slow recharge rate such that the recharge takes longer than the time taken to extend the hydraulic actuator, the recharging being performed by the motor moving the piston to eject hydraulic fluid from the charging chamber of the motor assembly into the accumulator chamber of the accumulator assembly.

The charging chamber of the motor assembly may be a cylinder.

The step of hydraulically extending the hydraulic actuator may be performed by hydraulically coupling the accumulator assembly to a bottom chamber of the hydraulic actuator by setting the selector valve to a first setting.

The step of hydraulically extending the hydraulic actuator may be performed by, in addition to hydraulically coupling the accumulator assembly to a bottom chamber of the hydraulic actuator, also hydraulically coupling the accumulator assembly to the piston-side chamber, by setting the selector valve to the first setting.

The method may further comprise hydraulically retracting the hydraulic actuator.

The method may further comprise, after hydraulically retracting the hydraulic actuator, recharging the accumulator assembly with hydraulic fluid via the hydraulic circuit at a relatively slow recharge rate such that the recharge takes longer than the time taken to retract the hydraulic actuator.

The method may further comprise performing at least an emergency extension of the hydraulic actuator.

In a further aspect, the invention provides a method of operating an aircraft, comprising operating a first moveable part of the aircraft by implementing the method of any of the above aspects using a first hydraulic system, and operating a second moveable part of the aircraft of the aircraft by implementing the method of any of the above aspects using a second hydraulic system, the first and second hydraulic systems being two respective closed hydraulic systems.

In a further aspect, the invention provides a method of operating a hydraulic system comprising a hydraulic actuator, a selector valve, a motor assembly, and an accumulator assembly hydraulically coupled in a hydraulic circuit, the motor assembly comprising a motor, a piston and a charging chamber, the accumulator assembly comprising an accumulator chamber, the charging chamber and the accumulator chamber being hydraulically coupled to each other via a part of the hydraulic circuit; the method comprising: hydraulically extending the hydraulic actuator, the hydraulic extension being provided at least in part by hydraulic fluid being discharged from the accumulator chamber via the selector valve to the hydraulic actuator responsive to the selector valve being switched; and thereafter, recharging the accumulator assembly with hydraulic fluid at a relatively slow recharge rate that is lower than the rate at which hydraulic fluid was discharged from the accumulator chamber via the selector valve to the hydraulic actuator to provide (at least in part) the extension of the hydraulic actuator, the recharging being performed by the motor moving the piston to eject hydraulic fluid from the charging chamber of the motor assembly into the accumulator chamber of the accumulator assembly.

In a further aspect, the invention provides a hydraulic charging and driving system for extending and retracting a hydraulic actuator, comprising: a motor assembly; and an accumulator assembly, the motor assembly and the accumulator assembly being hydraulically coupled to each other; wherein the motor assembly is arranged to recharge the accumulator assembly with hydraulic fluid at a relatively slow rate that is slower than the rate at which the accumulator assembly is arranged to discharge when actuating the hydraulic actuator.

The system may further comprise a selector valve.

The accumulator assembly may comprise an accumulator chamber, and a compression means provided within the accumulator chamber.

The motor assembly may comprise a motor arranged to vary a volume of a hydraulic charging chamber of the motor assembly.

The system may further comprise a hydraulic actuator comprising a bottom chamber and a piston-side chamber; wherein the accumulator assembly may be hydraulically coupled to the bottom chamber via a first setting of the selector valve to provide extension of the hydraulic actuator.

The accumulator assembly may be further hydraulically coupled to the piston-side chamber, in addition to being hydraulically coupled to the bottom chamber, via the first setting of the selector valve to provide extension of the hydraulic actuator.

The piston-side chamber may be hydraulically coupled to the motor assembly via a further setting of the selector valve to provide retraction of the hydraulic actuator.

The system may further comprise an emergency assembly arranged to provide at least emergency extension of the hydraulic actuator.

In a further aspect, the invention provides a method of operating a hydraulic system comprising a hydraulic actuator, a selector valve, and a motor assembly and an accumulator assembly hydraulically coupled in a hydraulic circuit; the method comprising: hydraulically extending the hydraulic actuator; thereafter, recharging the accumulator assembly with hydraulic fluid via the hydraulic circuit at a relatively slow recharge rate such that the recharge takes longer than the time taken to extend the hydraulic actuator.

The step of recharging the accumulator assembly with hydraulic fluid may be performed by a motor of the motor assembly varying a volume of a hydraulic charging chamber of the motor assembly.

The step of hydraulically extending the hydraulic actuator may be performed by hydraulically coupling the accumulator assembly to a bottom chamber of the hydraulic actuator by setting the selector valve to a first setting.

The step of hydraulically extending the hydraulic actuator may be performed by, in addition to hydraulically coupling the accumulator assembly to a bottom chamber of the hydraulic actuator, also hydraulically coupling the accumulator assembly to the piston-side chamber, by setting the selector valve to the first setting.

The method may further comprise hydraulically retracting the hydraulic actuator.

The method may further comprise, after hydraulically retracting the hydraulic actuator, recharging the accumulator assembly with hydraulic fluid via the hydraulic circuit at a relatively slow recharge rate such that the recharge takes longer than the time taken to retract the hydraulic actuator.

The method may further comprise performing at least an emergency extension of the hydraulic actuator.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 is a process flowchart showing certain steps of a cyclic method of actuation using the hydraulic actuator system of FIG. 1;

DETAILED DESCRIPTION

Figure 1:
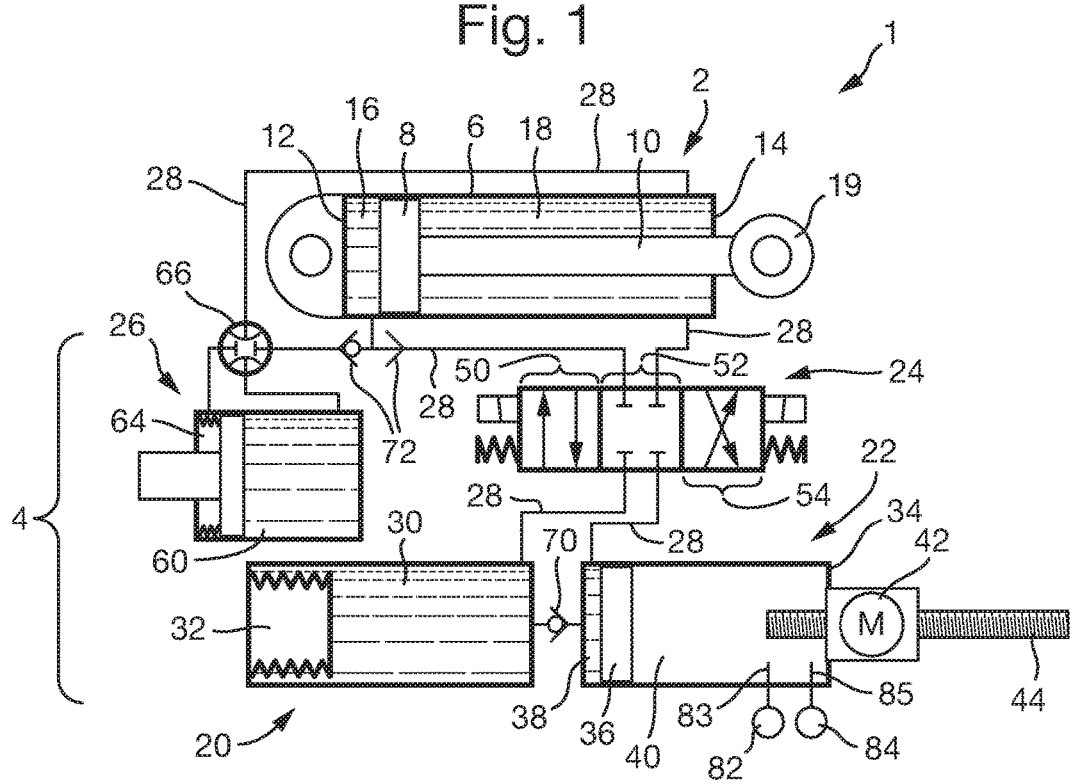
FIG. 1 is a schematic illustration (not to scale) of a hydraulic actuator system.

FIG. 1 is a schematic illustration (not to scale) of a first embodiment of a hydraulic actuator system 1.

In this embodiment the hydraulic actuator system 1 comprises a linear hydraulic actuator 2 that is hydraulically coupled to a hydraulic charging and driving system 4 adapted to hydraulically charge the linear hydraulic actuator 2.

In this embodiment the linear hydraulic actuator 2 comprises a cylinder barrel 6, a piston (which may also be termed an actuator valve) 8, and a piston rod 10 attached to the piston 8. The piston is arranged to be able to move back and forth along the cylinder barrel 6. The cylinder barrel 6 is closed at one end by a cylinder base (which may also be termed cap) 12. The cylinder barrel 6 is closed at its other end by a cylinder head 14 where the piston rod 10 comes out of the cylinder barrel 6. The piston 8 divides the inside of the cylinder barrel 6 into two chambers, namely a bottom chamber 16 at the cylinder base 12 side of the piston 8 and a piston rod side chamber 18 at the cylinder head 14 side of the piston 8. In conventional fashion the piston 8 is provided with sliding rings and seals (not shown). The piston rod 10 is provided with an actuator load connector 19, for connecting the moving piston rod 10 with the load that is to be moved by operation of the linear hydraulic actuator 2.

In this embodiment the hydraulic charging and driving system 4 comprises an accumulator assembly 20, a motor assembly 22, a three-position selector valve 24, and an optional emergency assembly 26.

In this embodiment a hydraulic circuit 28 hydraulically couples the above described elements as follows: the accumulator assembly 20 is hydraulically coupled to the motor assembly and the three-position selector valve 24. The motor assembly 22 is further coupled to the three-position selector valve 24. The three-position selector valve 24 is further coupled to the emergency assembly 26 and the linear hydraulic actuator 2. The emergency assembly 26 is further coupled to the linear hydraulic actuator 2.

In this embodiment the accumulator assembly 20 comprises an accumulator cylinder 30 and a bellows 32. The bellows 32 is provided within the accumulator cylinder 30. The bellows 32 is spring loaded, such that when the bellows 32 is in a compressed state (as shown schematically in FIG. 1) the bellows 32 is exerting a force on the hydraulic fluid constrained in the accumulator cylinder 30. The accumulator assembly 20 is further provided with a pressure switch (not shown).

In this embodiment the motor assembly 22 comprises a motor assembly cylinder 34. A floating piston 36 is provided within the motor assembly cylinder 34. The floating piston 36 is arranged to be able to move back and forth along the motor assembly cylinder 34. The floating piston 36 divides the inside of the motor assembly cylinder 34 into two chambers, namely a charging chamber 38 and an air chamber 40. In conventional fashion the piston 8 is provided with sliding rings and seals (not shown). The motor assembly further comprises a motor and a lead screw 44 coupled to the motor 42. In operation, as will be described in more detail later below, at certain stages of operation the motor 42 drives the lead screw 44 in an inward direction inside the motor assembly cylinder 34 to push the floating piston 36 along the inside of the motor assembly cylinder 34 (thereby reducing the volume of the charging chamber 38), and at certain other stages of operation the motor 42 retracts the lead screw 44 in an outward direction inside the motor assembly cylinder 34 to thereby leave the floating piston 36 in floating mode. The motor assembly 22 is further provided with two pre-set retract switches, namely a first retract switch 82 at a first retract position 83, and a second retract switch 84 at a second retract position 85. As will be described in further detail later below, the two retract switches with their respective differing retract positions provide for the end of the lead screw 44 and consequently the position of the floating piston 36 to have two available floating positions each of which is used at different stages of operation when the charging chamber 38 is to be filled, thereby providing two different volumes of hydraulic liquid in the charging chamber 38, one of which is used when setting the hydraulic actuator system 1 in a ready-to-retract status, and the other one of which is used when setting the hydraulic actuator system 1 in a ready-to-extend status, thereby accommodating the difference in volume between the maximum volume of the bottom chamber 16 of the cylinder barrel 6 and the maximum volume of the piston rod side chamber 18 of the cylinder barrel 6.

In this embodiment the three-position selector valve 24, provides links (or blocks the potential links) between lengths of the hydraulic circuit 28 so as to hydraulically connect (or block connection of) the accumulator cylinder 30 or the charging chamber 38 to the bottom chamber 16 of the cylinder barrel 6 or the piston rod side chamber 18 of the cylinder barrel 6.

In more detail, in this embodiment the three-position selector valve 24 is adjustable between three positions, namely a first open position 50, a closed position 52, and a second open position 54. When the three-position selector valve 24 is in the first open position 50, the accumulator cylinder 30 is connected to the bottom chamber 16 of the cylinder barrel 6, and the charging chamber 38 is connected to the piston rod side chamber 18 of the cylinder barrel 6. When, instead, the three-position selector valve 24 is in the closed position 52, there is no connection between the accumulator cylinder 30 and either of the bottom chamber 16 of the cylinder barrel 6 or the piston rod side chamber 18 of the cylinder barrel 6, and also there is no connection between the charging chamber 38 and either of the bottom chamber 16 of the cylinder barrel 6 or the piston rod side chamber 18 of the cylinder barrel 6. When, instead, the three-position selector valve 24 is in the second open position 54, the accumulator cylinder 30 is connected to the piston rod side chamber 18 of the of the cylinder barrel 6, and the charging chamber 38 is connected to the bottom chamber 16 of the cylinder barrel 6. It is noted that in FIG. 1 the three-position selector valve 24 is in the closed position 52.

In this embodiment the optional emergency assembly 26 comprises an accumulator cylinder 60 and a bellows 64, for convenience termed herein an emergency cylinder 60 and an emergency bellows 64, respectively. The emergency bellows 64 is spring loaded, such that when the emergency bellows 64 is in a compressed state (as shown schematically in FIG. 1) the emergency bellows 64 is exerting a force on the hydraulic fluid constrained in the emergency cylinder 60. The emergency assembly 26 is hydraulically coupled to the hydraulic circuit 28 via an emergency extend valve 66. When the emergency assembly 26 is in standby mode (as is the case in FIG. 1 and also later FIGS. 3-9), the emergency bellows 64 is compressed, with the emergency cylinder 60 therefore at its maximum volume and full of hydraulic fluid available for insertion into the linear hydraulic actuator 2 in the event of failure of the main operation of the hydraulic actuator system 1, as will be described later below with reference to FIG. 10.

Details of certain further connections provided by the hydraulic circuit 28 are as follows. The hydraulic circuit 28 further connects the accumulator cylinder 30 to the charging chamber 38 via a check valve (one-way valve) 70. Also, the hydraulic circuit 28 further connects the bottom chamber 16 of the cylinder barrel 6 to the emergency extend valve 66 of the emergency assembly 26 via a first shuttle valve 72.

Figure 8:
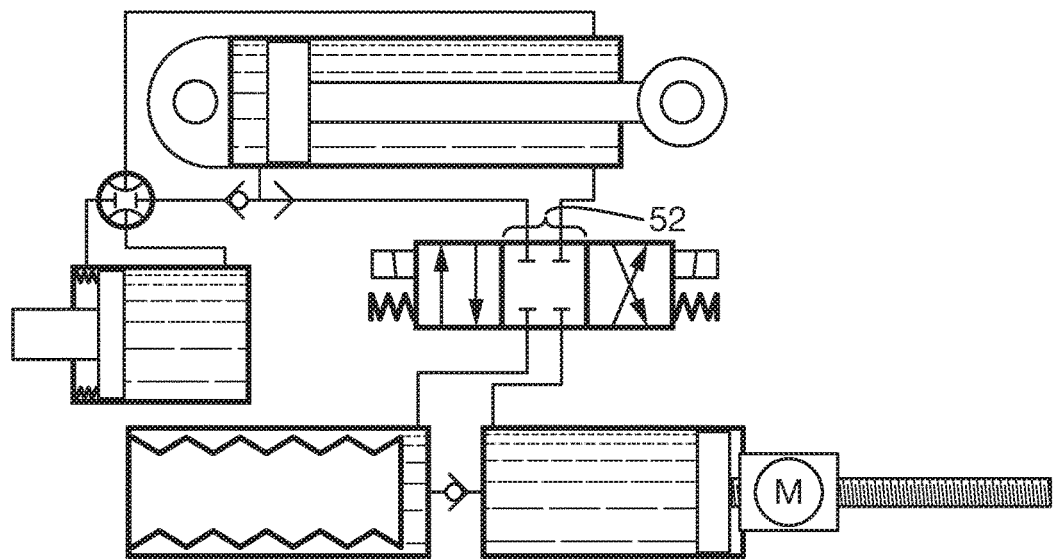
Figure 9:
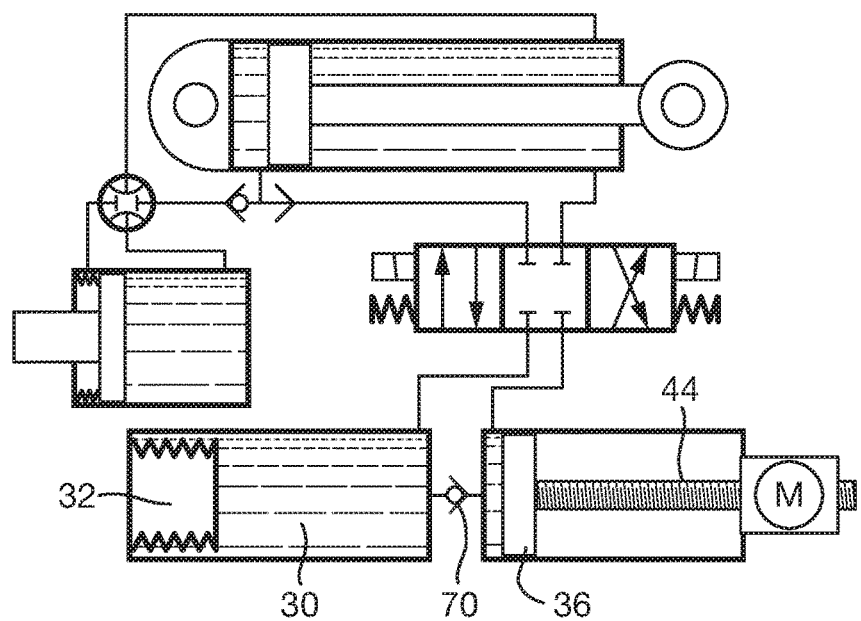
Figure 10:
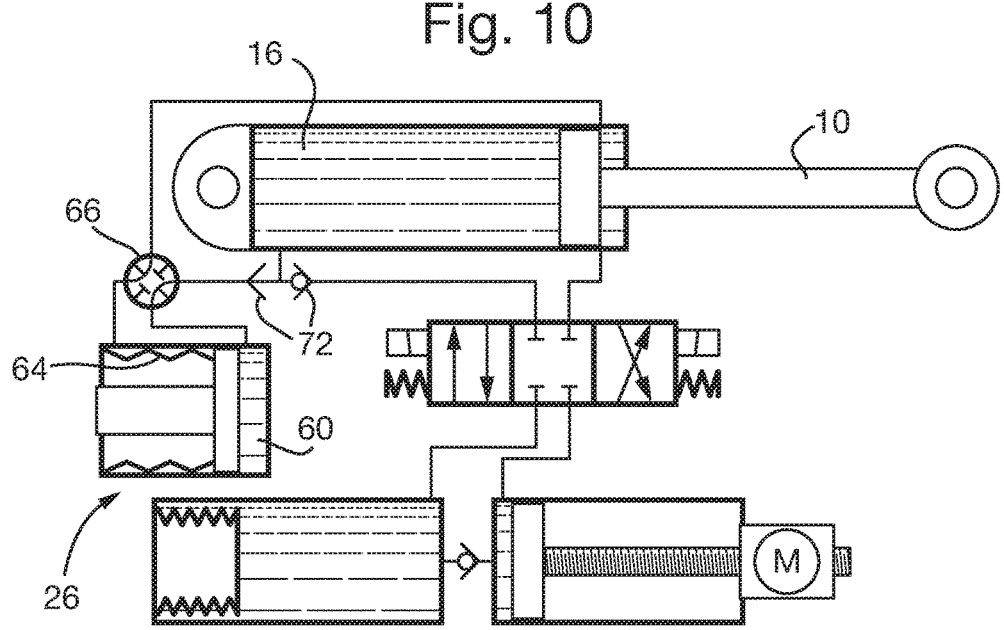
FIG. 10 shows the hydraulic actuator system when an optional emergency actuation process is carried out.

Operation of the hydraulic actuator system 1 of this embodiment will now be described with reference to FIGS. 1 to 10. FIG. 2 is a process flowchart showing certain steps of a cyclic method of actuation using the hydraulic actuator system 1. FIG. 1 and FIGS. 3 to 9 show the hydraulic actuator system 1 at respective stages of the method of FIG. 2. FIG. 10 shows the hydraulic actuator system 1 when an optional emergency actuation process is carried out using the above described optional emergency assembly 26.

For convenience the process will be described by starting from the condition that is shown for the hydraulic actuator system 1 in FIG. 1. However, it will be appreciated that the cyclic process may equally in fact be considered as starting at any of the stages to be described below, i.e. starting from any of the conditions that are shown for the hydraulic actuator system 1 in any of FIG. 1 or FIGS. 3 to 9.

At step s2, and as shown in FIG. 1, the hydraulic actuator system 1 is in a retracted state ready for extension (i.e. ready to extend the piston rod 10). In this state, the bottom chamber 16 of the cylinder barrel 6 is in its lowest volume state, and the bellows 32 of the accumulator assembly 20 is in its compressed state, hence the accumulator cylinder 30 is in its largest volume state. The three position valve 24 is in the earlier described closed position 52. The lead screw 44 is in one of its retracted positions, more particularly the first retract position 83, i.e. the lead screw 44 has previously been moved in an outward direction inside the motor assembly cylinder 34 until movement was stopped by the first retract switch 82 due to the end of the lead screw 44 reaching the first retract position 83, to thereby leave the floating piston 36 in floating mode.

Figure 3:
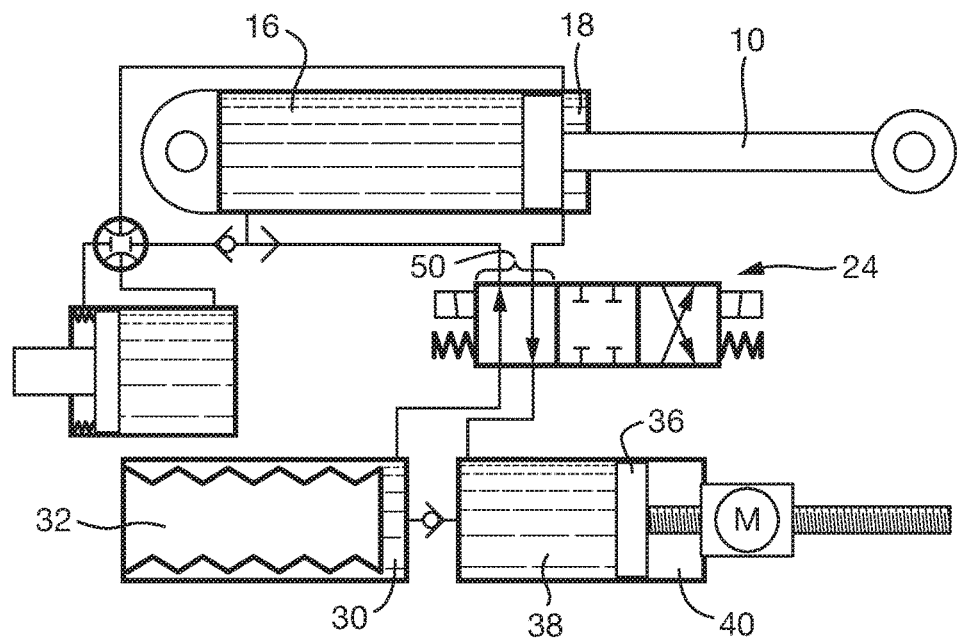
FIGS. 3 to 9 (and above mentioned FIG. 1) show the hydraulic actuator system at respective stages of the method of FIG. 2.

At step s4, the three position valve 24 is moved to the earlier described first open position 50. Consequently the hydraulic fluid previously constrained in the accumulator cylinder 30 may now be pushed out of the accumulator cylinder 30 by virtue of the bellows 32 expanding from its compressed state to its extended state. Consequently hydraulic fluid flows in the hydraulic circuit 28 with a net effect of flowing from the accumulator cylinder 30 via the three position valve 24 to the bottom chamber 16 of the cylinder barrel 6, and from the piston rod side 18 of the cylinder barrel 6 via the three position valve 24 to the charging chamber 38 of the accumulator assembly 20. As a result, the piston rod 10 of the linear hydraulic actuator 2 extends, and also the floating piston 36 of the accumulator assembly 20 is repositioned at the end of the retracted lead screw 44, i.e. at the first retract position 83. In overview, step s4 may be summarised as the three position valve 24 being moved to an extend position (the first open position 50) thereby leading to extension of the actuator under charge pressure. The resulting state of the hydraulic actuator system 1 is shown in FIG. 3.

Figure 4:
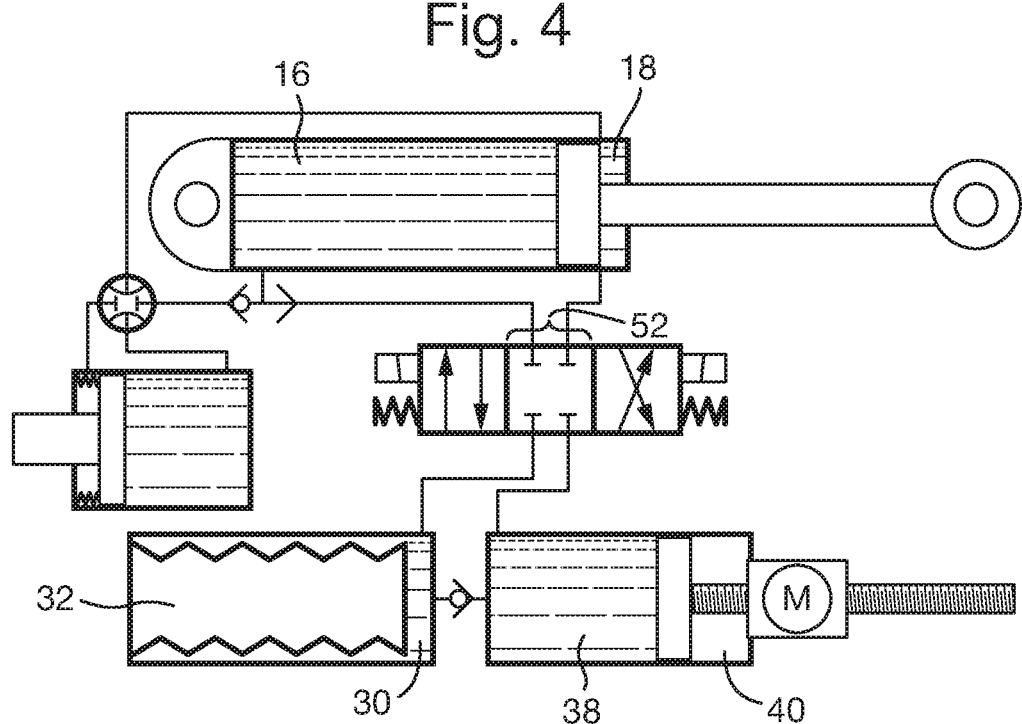

At step s6, the three position valve 24 is moved to the earlier described closed position 50. In overview, step s6 may be summarised as the three position valve 24 being reset to neutral position. The resulting state of the hydraulic actuator system 1 is shown in FIG. 4.

Figure 5:
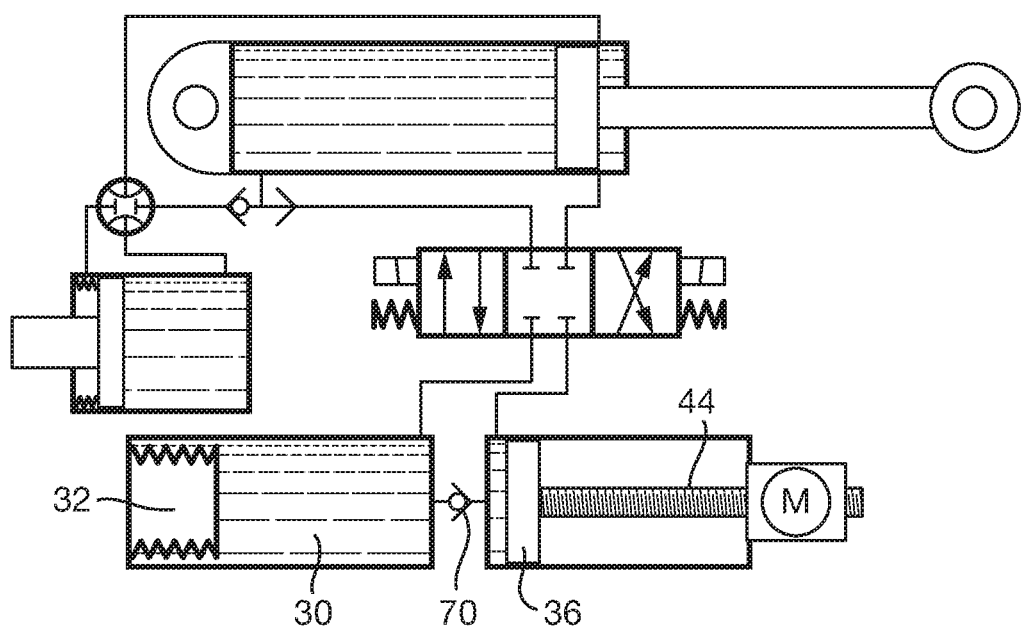

At step s8, the motor 42 of the motor assembly 22 is used to drive the lead screw 44 in an inward direction into the motor assembly cylinder 34, thereby pushing the floating piston 36 against the hydraulic fluid in the motor assembly cylinder 34 thereby transferring the hydraulic fluid in the motor assembly cylinder 34 into the accumulator cylinder 30 via the shuttle valve 70 (this fluid compressing the bellows 32) thereby recharging the accumulator cylinder 30. When the hydraulic pressure in the accumulator cylinder 30 has reached a pre-determined level, the pressure switch (not shown) of the accumulator cylinder 30 signals the motor 42 to stop driving the lead screw in the inward direction (and instead, to thereafter commence the retreat motion described below as part of step s10). The motor 42 may be a relatively small motor i.e. of relatively low power, and this recharging process may take place relatively slowly, over a relatively large time period, for example taking longer than one minute, even for example taking longer than three minutes. In particular, this recharge time period may be significantly longer than the time taken for the actuator to extend in the course of above described step s4, which may only, for example, take less than thirty seconds, or may even take less than ten seconds (and likewise compared to the time for the actuator retraction step s12 described later below). In overview, step s8 may be summarised as performing relatively slow accumulator recharge using a relatively low powered motor. (However, in other embodiments, a larger powered motor may be used, and accumulator recharge may be performed more quickly). The resulting state of the hydraulic actuator system 1 is shown in FIG. 5.

Figure 6:
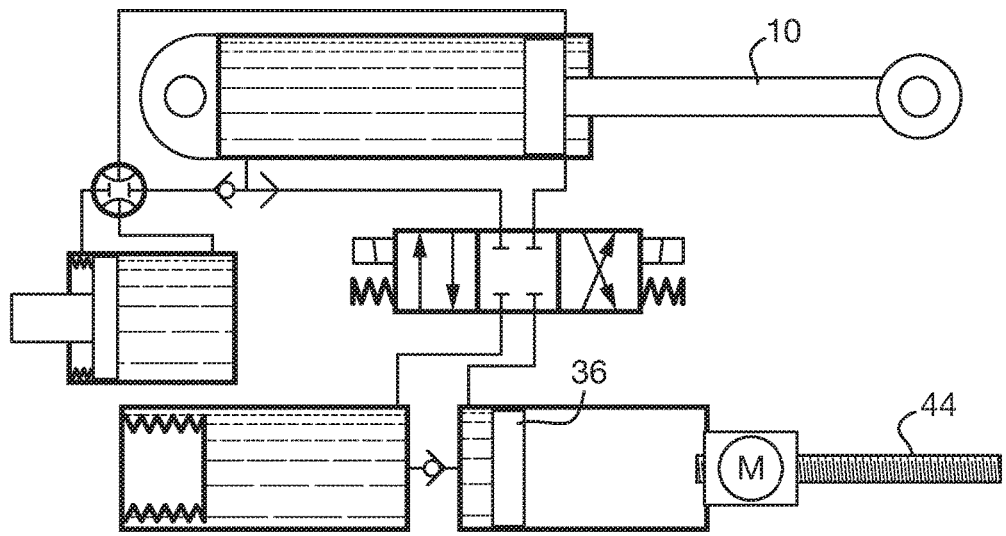

At step s10, the motor 42 retracts the lead screw 44 in an outward direction inside the motor assembly cylinder 34 until the second retract switch 84 stops the retraction of the lead screw 44 when the end of the lead screw 44 reaches the second retract position 85, to thereby leave the floating piston 36 in floating mode. Accordingly, the hydraulic actuator system 1 is put in in a state that is ready for retraction of the actuator i.e. ready for retraction of the piston rod 10. In overview, step s10 may be summarised as resetting the lead screw 44 thereby making the hydraulic actuator system ready for retraction. The resulting "ready for retraction" state of the hydraulic actuator system 1 is shown in FIG. 6.

Figure 7:
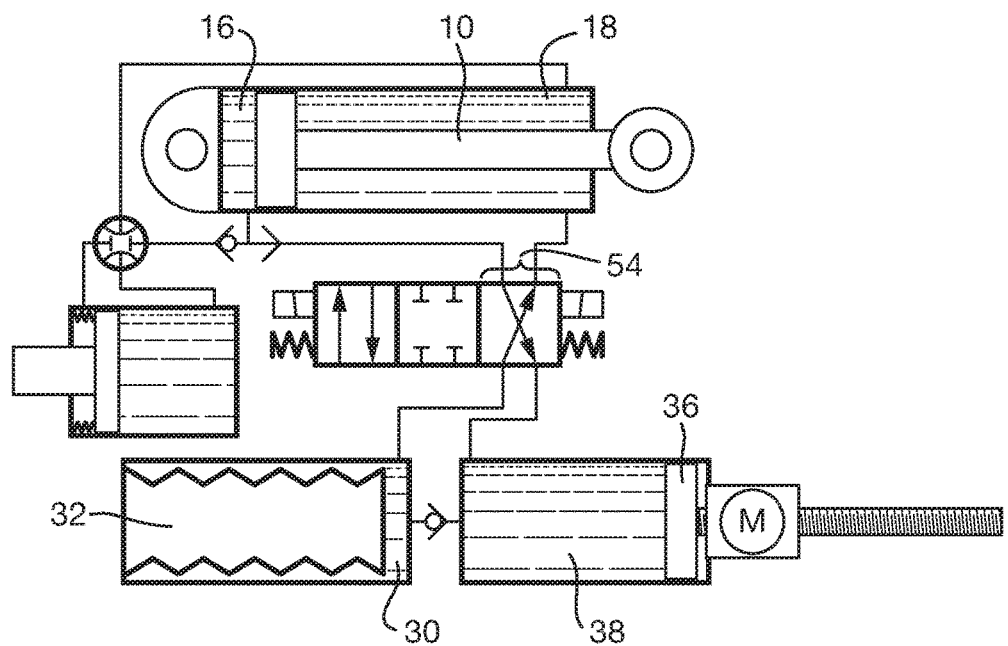

At step s12, the three position valve 24 is moved to the earlier described second open position 54. Consequently the bellows 32 of the accumulator assembly 20 extend and hydraulic fluid flows in the hydraulic circuit 28 with a net effect of flowing from the accumulator cylinder 30 via the three position valve 24 to the piston rod side 18 of the cylinder barrel 6, and from the bottom chamber 16 of the cylinder barrel 6 via the three position valve 24 to the charging chamber 38 of the accumulator assembly 20. As a result, the piston rod 10 of the linear hydraulic actuator 2 retracts, and also the floating piston 36 of the accumulator assembly 20 is repositioned at the end of the retracted lead screw 44, i.e. at the second retract position 85. In overview, step s12 may be summarised as the three position valve 24 being moved to a retract position (the second open position 54) thereby leading to retraction of the actuator under charge pressure. The resulting state of the hydraulic actuator system 1 is shown in FIG. 7.

At step s14, the three position valve 24 is moved to the earlier described closed position 52. In overview, step s14 may be summarised as the three position valve 24 being reset to neutral position. The resulting state of the hydraulic actuator system 1 is shown in FIG. 8.

At step s16, the motor 42 of the accumulator assembly 20 is used to drive the lead screw 44 in an inward direction into the motor assembly cylinder 34, thereby pushing the floating piston 36 against the hydraulic fluid in the motor assembly cylinder 34 thereby transferring the hydraulic fluid in the motor assembly cylinder 34 into the accumulator cylinder 30 via the shuttle valve 70 (this fluid compressing the bellows 32) thereby recharging the accumulator cylinder 30. As stated above, the motor 42 may be a relatively small motor i.e. of relatively low power, and this recharging process may take place relatively slowly, over a relatively large time period, for example taking longer than one minute, even for example taking longer than three minutes. In particular, this recharge time period may be significantly longer than the time taken for the actuator to extend in the course of above described step s4, which may only, for example, take less than thirty seconds, or may even take less than ten seconds and likewise compared to the time for the actuator retraction step s12 also described above). In overview, step s16 may be summarised as performing relatively slow accumulator recharge using a relatively low powered motor. (However, as stated above, in other embodiments, a larger powered motor may be used, and accumulator recharge may be performed more quickly). The resulting state of the hydraulic actuator system 1 is shown in FIG. 9.

At step s18, the motor 42 retracts the lead screw 44 in an outward direction inside the motor assembly cylinder 34 until the first retract switch 82 stops the retraction of the lead screw 44 when the end of the lead screw 44 reaches first retract position 83, to thereby leave the floating piston 36 in floating mode. Accordingly, the hydraulic actuator system 1 is put in in a state that is ready for extension of the actuator i.e. ready for extension of the piston rod 10. In overview, step s18 may be summarised as resetting the lead screw 44 thereby making the hydraulic actuator system ready for extension. The resulting "ready for extension" state of the hydraulic actuator system 1 is the same state as described at step s2 and already shown in FIG. 1, i.e. the hydraulic actuator system 1 is back at the FIG. 1 state of its cyclic operational capability, and accordingly any or all of steps s4 to s18 may be repeated if desired.

As mentioned above, in this embodiment an optional emergency actuation process is provided using the above described optional emergency assembly 26, as described in the following paragraph. However, this need not be the case, and in other embodiments the optional emergency assembly is not included in the hydraulic actuator system 1. In yet further embodiments, an emergency assembly is provided, however it is of a different arrangement to that described below.

FIG. 10 shows the hydraulic actuator system 1 implementing the optional emergency assembly 26 in order to carry out an emergency extension of the actuator. The emergency extend valve 66 is activated to allow the emergency bellows 64 to expand thereby pushing the hydraulic fluid in the emergency cylinder 60 from the emergency cylinder 60 into the bottom chamber 16 of the cylinder barrel 6. As a result, the piston rod 10 of the linear hydraulic actuator 2 extends, with the hydraulic fluid previously in the piston rod side 18 being vented to allow this. The venting may be implemented by any appropriate means or route (not shown).

Figure 11:
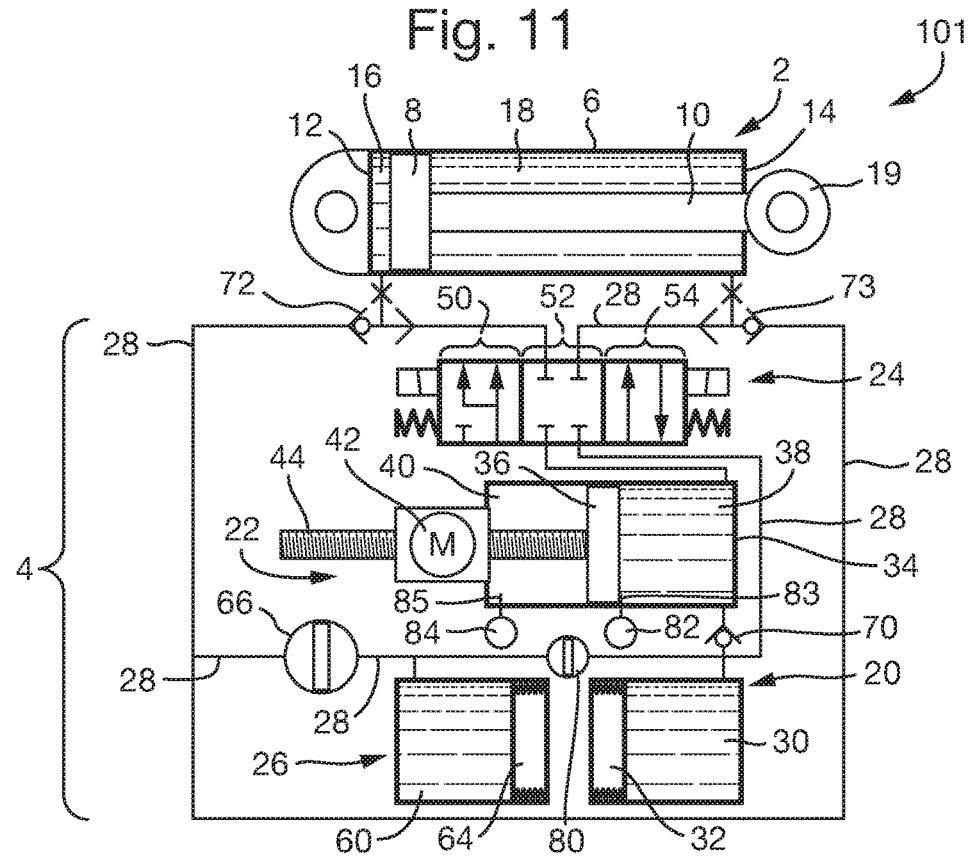
FIG. 11 is a schematic illustration (not to scale) of a further hydraulic actuator system.

FIG. 11 is a schematic illustration (not to scale) of a further embodiment of a hydraulic actuator system 101. In this embodiment the hydraulic actuator system 101 comprises a linear hydraulic actuator 2 that is hydraulically coupled to a hydraulic charging and driving system 4 adapted to hydraulically charge the linear hydraulic actuator 2.

In this embodiment the linear hydraulic actuator 2 comprises a cylinder barrel 6, a piston (which may also be termed an actuator valve) 8, and a piston rod 10 attached to the piston 8. The piston is arranged to be able to move back and forth along the cylinder barrel 6. The cylinder barrel 6 is closed at one end by a cylinder base (which may also be termed cap) 12. The cylinder barrel 6 is closed at its other end by a cylinder head 14 where the piston rod 10 comes out of the cylinder barrel 6. The piston 8 divides the inside of the cylinder barrel 6 into two chambers, namely a bottom chamber 16 at the cylinder base 12 side of the piston 8 and a piston rod side chamber 18 at the cylinder head 14 side of the piston 8. In conventional fashion the piston 8 is provided with sliding rings and seals (not shown). The piston rod 10 is provided with an actuator load connector 19, for connecting the moving piston rod 10 with the load that is to be moved by operation of the linear hydraulic actuator 2.

In this embodiment the hydraulic charging and driving system 4 comprises an accumulator assembly 20, a motor assembly 22, a three-position selector valve 24, and an optional emergency assembly 26.

In this embodiment a hydraulic circuit 28 hydraulically couples the above described elements as follows: the accumulator assembly 20 is hydraulically coupled to the motor assembly 22, the three-position selector valve 24, and the optional emergency assembly 26. The motor assembly 22 is further coupled to the three-position selector valve 24 and the optional emergency assembly 26. The three-position selector valve 24 is further coupled to the emergency assembly 26 and the linear hydraulic actuator 2. The emergency assembly 26 is further coupled to the linear hydraulic actuator 2.

In this embodiment the accumulator assembly 20 comprises an accumulator cylinder 30 and a bellows 32. The bellows 32 is provided within the accumulator cylinder 30. The bellows 32 is spring loaded, such that when the bellows 32 is in a compressed state (as shown schematically in FIG. 11) the bellows 32 is exerting a force on the hydraulic fluid constrained in the accumulator cylinder 30. The accumulator assembly 20 is further provided with a pressure switch (not shown).

In this embodiment the motor assembly 22 comprises a motor assembly cylinder 34. A floating piston 36 is provided within the motor assembly cylinder 34. The floating piston 36 is arranged to be able to move back and forth along the motor assembly cylinder 34. The floating piston 36 divides the inside of the motor assembly cylinder 34 into two chambers, namely a charging chamber 38 and an air chamber 40. In conventional fashion the piston 8 is provided with sliding rings and seals (not shown). The motor assembly further comprises a motor and a lead screw 44 coupled to the motor 42. In operation, as will be described in more detail later below, at certain stages of operation the motor 42 drives the lead screw 44 in an inward direction inside the motor assembly cylinder 34 to push the floating piston 36 along the inside of the motor assembly cylinder 34 (thereby reducing the volume of the charging chamber 38), and at certain other stages of operation the motor 42 retracts the lead screw 44 in an outward direction inside the motor assembly cylinder 34 to thereby leave the floating piston 36 in floating mode. The motor assembly 22 is further provided with two pre-set retract switches, namely a first retract switch 82 at a first retract position 83, and a second retract switch 84 at a second retract position 85. As will be described in further detail later below, the two retract switches with their respective differing retract positions provide for the end of the lead screw 44 and consequently the position of the floating piston 36 to have two available floating positions each of which is used at different stages of operation when the charging chamber 38 is to be filled, thereby providing two different volumes of hydraulic liquid in the charging chamber 38, one of which is used when setting the hydraulic actuator system 101 in a ready-to-retract status, and the other one of which is used when setting the hydraulic actuator system 101 in a ready-to-extend status, thereby accommodating the difference in volume between the maximum volume of the bottom chamber 16 of the cylinder barrel 6 and the maximum volume of the piston rod side chamber 18 of the cylinder barrel 6.

In this embodiment the three-position selector valve 24, provides links (or blocks the potential links) between lengths of the hydraulic circuit 28 so as to hydraulically connect (or block connection of) the accumulator cylinder 30 or the charging chamber 38 to the bottom chamber 16 of the cylinder barrel 6 or the piston rod side chamber 18 of the cylinder barrel 6.

In more detail, in this embodiment the three-position selector valve 24 is adjustable between three positions, namely a first open position 50, a closed position 52, and a second open position 54. When the three-position selector valve 24 is in the first open position 50, the accumulator cylinder 30 is connected to both the bottom chamber 16 of the cylinder barrel 6 and to the piston rod side chamber 18 of the cylinder barrel 6. When, instead, the three-position selector valve 24 is in the closed position 52, there is no connection between the bottom chamber 16 of the cylinder barrel 6 and either of the accumulator cylinder 30 and the charging chamber 38, and also there is no connection between the piston rod side chamber 18 of the cylinder barrel 6 and either of the accumulator cylinder 30 and the charging chamber 38. When, instead, the three-position selector valve 24 is in the second open position 54, the accumulator cylinder 30 is connected to the piston rod side chamber 18 of the of the cylinder barrel 6, and the charging chamber 38 is connected to the bottom chamber 16 of the cylinder barrel 6. It is noted that in FIG. 11 the three-position selector valve 24 is in the closed position 52.

In this embodiment the optional emergency assembly 26 comprises an accumulator cylinder 60 and a bellows 64, for convenience termed herein an emergency cylinder 60 and an emergency bellows 64, respectively. The emergency bellows 64 is provided within the emergency cylinder 60. The emergency bellows 64 is spring loaded, such that when the emergency bellows 64 is in a compressed state (as shown schematically in FIG. 11) the emergency bellows 64 is exerting a force on the hydraulic fluid constrained in the emergency cylinder 60. The optional emergency assembly 26 is further provided with a pressure switch (not shown).

The emergency assembly 26 is hydraulically coupled to the hydraulic circuit 28 via an emergency extend valve 66 and via an emergency charge valve 80. When the emergency assembly 26 is in standby mode (as is the case in FIG. 11 and also later FIGS. 13-18), the emergency bellows 64 is compressed, with the emergency accumulator cylinder 60 therefore at its maximum volume and full of hydraulic fluid available for insertion into the linear hydraulic actuator 2 in the event of failure of the main operation of the hydraulic actuator system 101, as will be described later below with reference to FIGS. 19 and 20.

Details of certain further connections provided by the hydraulic circuit 28 are as follows. The hydraulic circuit 28 further connects the accumulator cylinder 30 to the charging chamber 38 via a check valve (one- way valve) 70. Also, the hydraulic circuit 28 further connects the bottom chamber 16 of the cylinder barrel 6 to the emergency extend valve 66 of the emergency assembly 26 via a first shuttle valve 72. Also, the hydraulic circuit 28 further connects the piston rod side chamber 18 of the cylinder barrel 6 to the emergency extend valve 66 of the emergency assembly 26 via a second shuttle valve 73.

Figure 12:
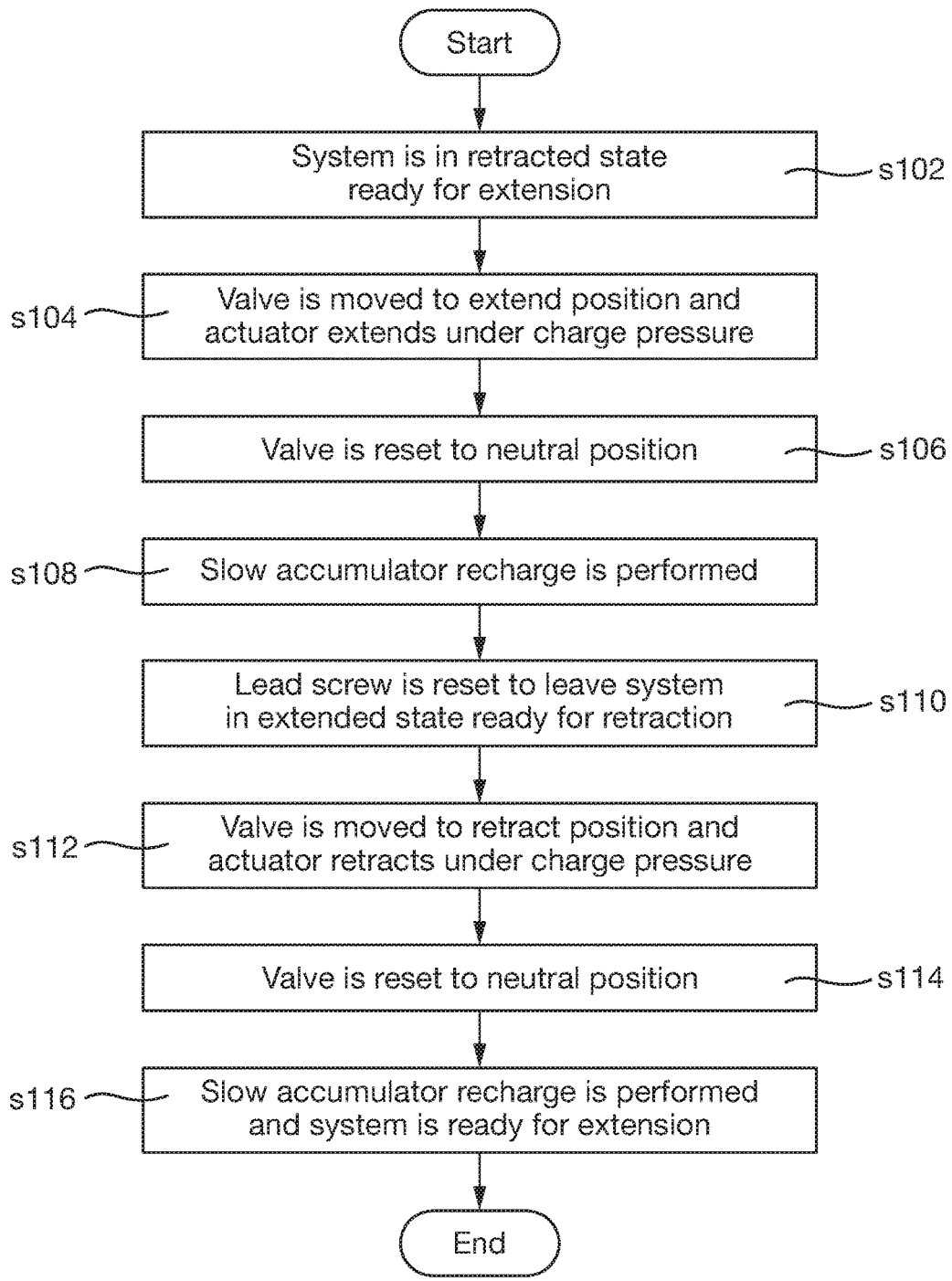
FIG. 12 is a process flowchart showing certain steps of a cyclic method of actuation using the hydraulic actuator system of FIG. 11.
Figure 17:
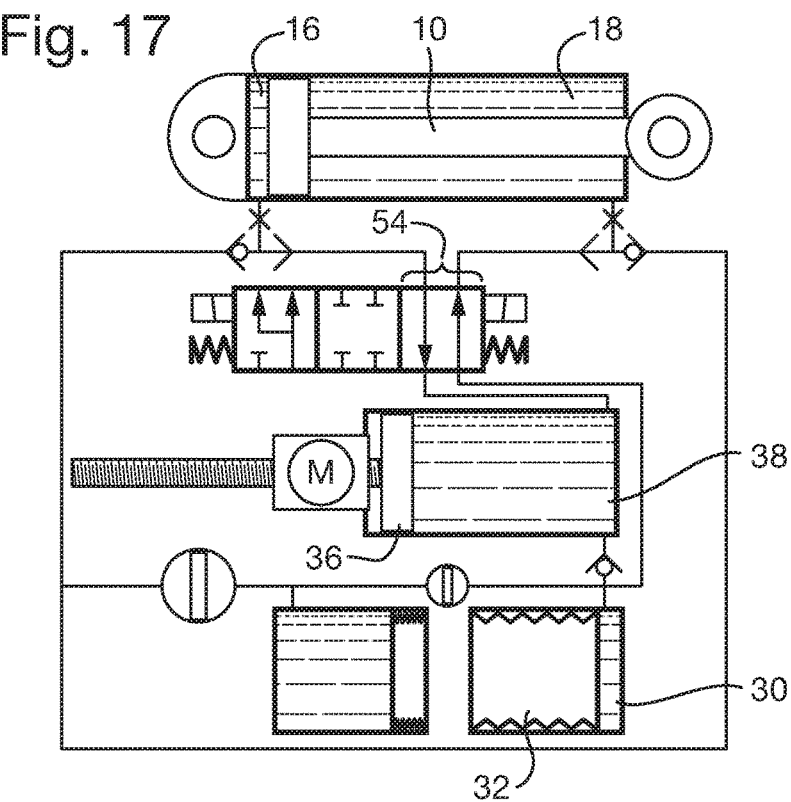
Figure 18:
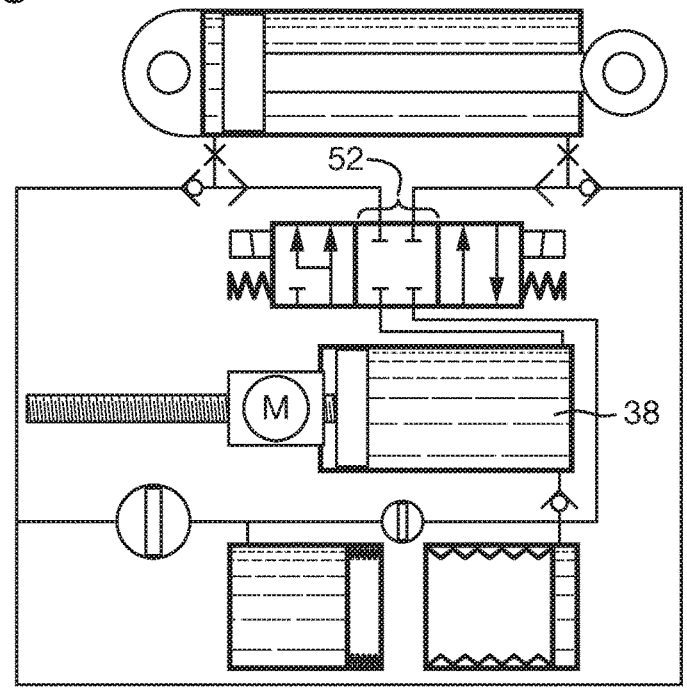
Figure 19:
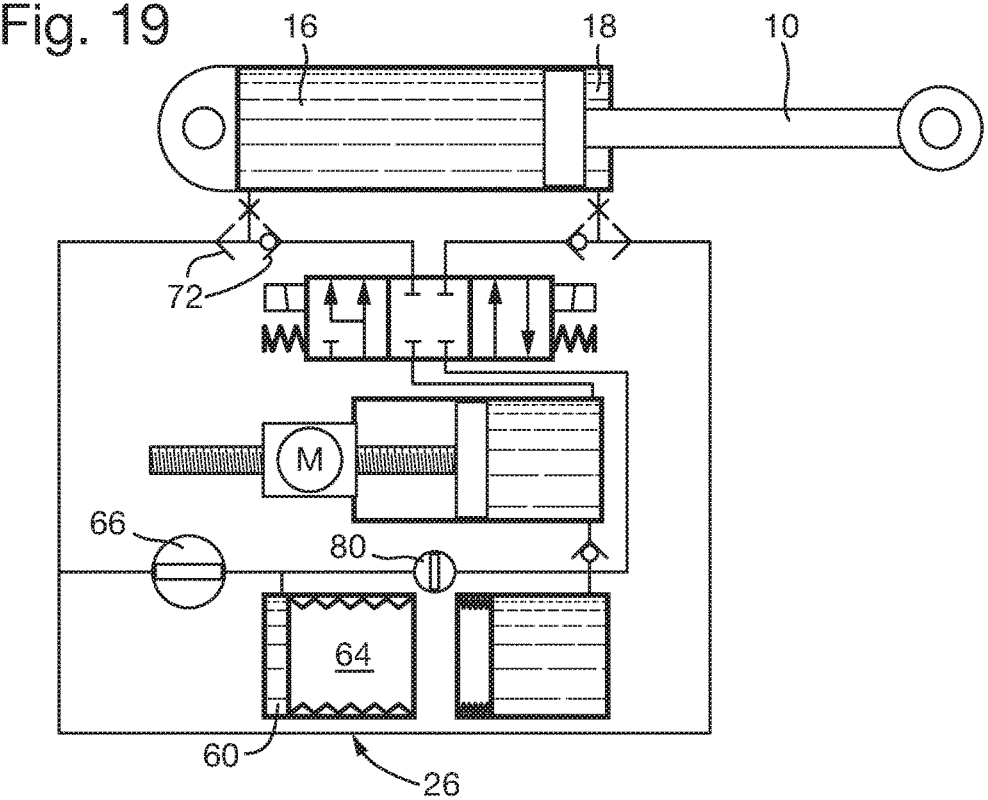
FIGS. 19 and 20 show the hydraulic actuator system when an optional emergency actuation process is carried out.
Figure 20:
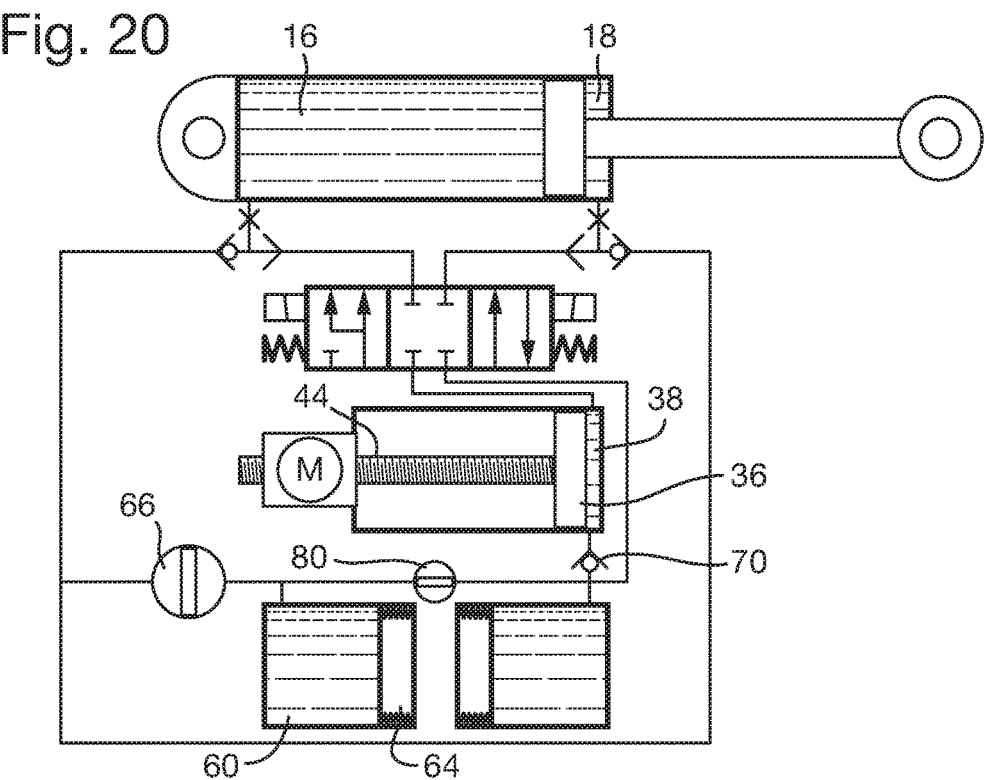

Operation of the hydraulic actuator system 101 of this embodiment will now be described with reference to FIGS. 11 to 20. FIG. 12 is a process flowchart showing certain steps of a cyclic method of actuation using the hydraulic actuator system 101. FIG. 11 and FIGS. 13 to 18 show the hydraulic actuator system 101 at respective stages of the method of FIG. 12. FIGS. 19 and 20 show the hydraulic actuator system 101 when an optional emergency actuation process is carried out using the above described optional emergency assembly 26.

For convenience the process will be described by starting from the condition that is shown for the hydraulic actuator system 101 in FIG. 11. However, it will be appreciated that the cyclic process may equally in fact be considered as starting at any of the stages to be described below, i.e. starting from any of the conditions that are shown for the hydraulic actuator system 101 in any of FIG. 11 or FIGS. 13 to 19.

At step s102, and as shown in FIG. 11, the hydraulic actuator system 101 is in a retracted state ready for extension (i.e. ready to extend the piston rod 10). In this state, the bottom chamber 16 of the cylinder barrel 6 is in its lowest volume state, and the bellows 32 of the accumulator assembly 20 are at their minimum extension, hence the accumulator cylinder 30 is in its largest volume state. The three position valve 24 is in the earlier described closed position 52. The lead screw 44 is in one of its retracted positions, more particularly the first retract position 83, i.e. the lead screw 44 has previously been moved in an outward direction inside the motor assembly cylinder 34 until movement was stopped by the first retract switch 82 due to the end of the lead screw 44 reaching the first retract position 83.

Figure 13:
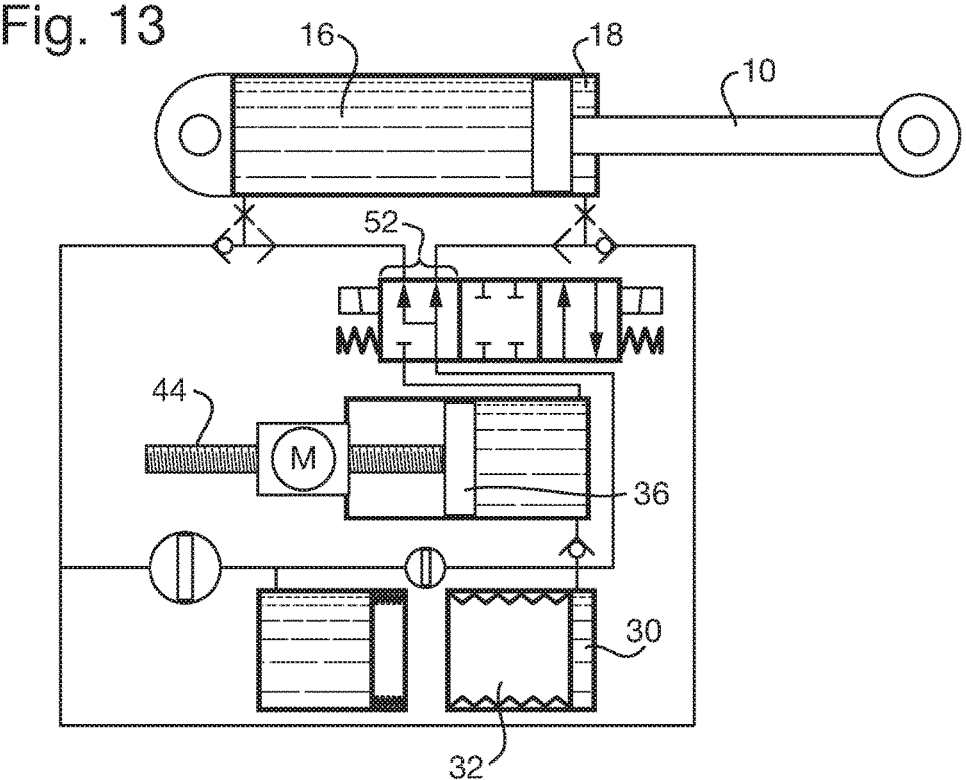
FIGS. 13 to 18 (and above mentioned FIG. 11) show the hydraulic actuator system at respective stages of the method of FIG. 12.

At step s104, the three position valve 24 is moved to the earlier described first open position 50. Consequently the hydraulic fluid previously constrained in the accumulator cylinder 30 may now be pushed out of the accumulator cylinder 30 by virtue of the bellows 32 expanding from its compressed state to its extended state. Consequently hydraulic fluid flows in the hydraulic circuit 28 with a net effect of flowing from the accumulator cylinder 30 via the three position valve 24 to the bottom chamber 16 of the cylinder barrel 6, and, in this embodiment, additionally also from the piston rod side 18 of the cylinder barrel 6 via the three position valve 24 to the bottom chamber 16 of the cylinder barrel 6. In this embodiment this flow arises in part from the aspect that the volume of fluid required to fill any given length of the bottom chamber 16 of the cylinder barrel 6 is larger than the comparison volume of fluid required to fill the corresponding given length of the piston rod side 18 of the cylinder barrel 6, hence in order for the combination of the bottom chamber 16 and the piston rod side 18 to accommodate the fluid being expelled from the accumulator cylinder 30 (under the action of the bellows 32) the piston rod 10 of the linear hydraulic actuator 2 extends, thereby giving the outcome that accommodates the fluid expelled from the accumulator cylinder 30. (In other embodiments, if the volume difference for a given length of the piston rod side 18 of the cylinder barrel 6 compared to the piston rod side 18 is not sufficient to accommodate all the fluid expelled from the accumulator cylinder 30, then hydraulic fluid previously in the piston rod side 18 may be vented to allow this. and this venting may be implemented by any appropriate means or route (not shown).) In this embodiment during this step the position of the floating piston 36 of the motor assembly 22 remains at the end of the retracted lead screw 44, i.e. at the first retract position 83. In overview, step s104 may be summarised as the three position valve 24 being moved to an extend position (the first open position 50) thereby leading to extension of the actuator under charge pressure. The resulting state of the hydraulic actuator system 101 is shown in FIG. 13.

Figure 14:
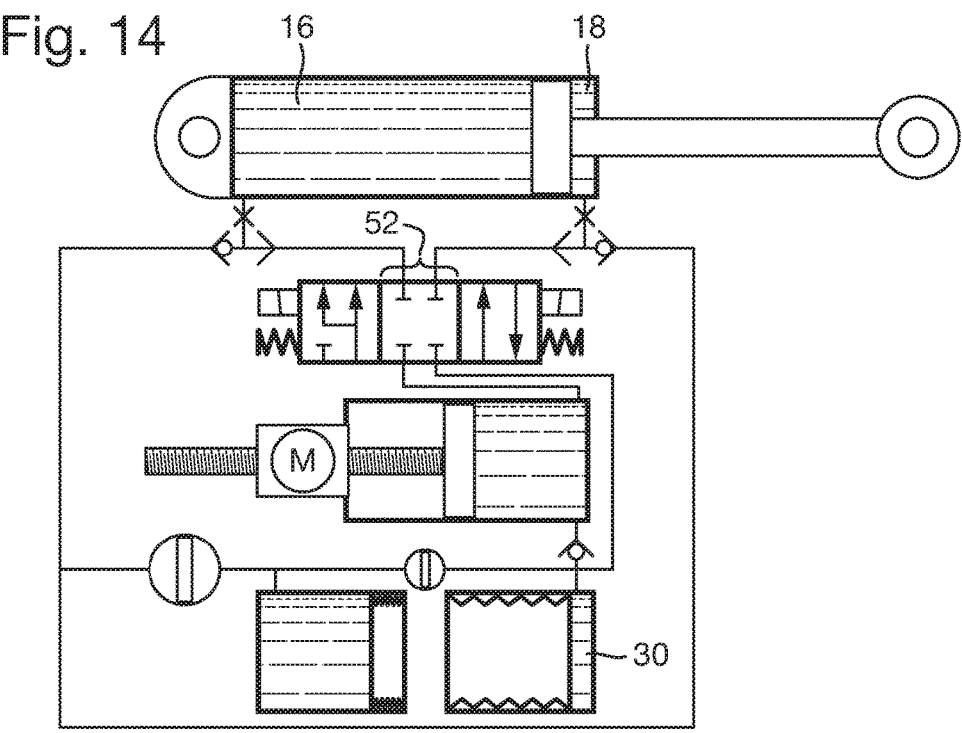

At step s106, the three position valve 24 is moved to the earlier described closed position 50. In overview, step s106 may be summarised as the three position valve 24 being reset to neutral position. The resulting state of the hydraulic actuator system 101 is shown in FIG. 14.

Figure 15:
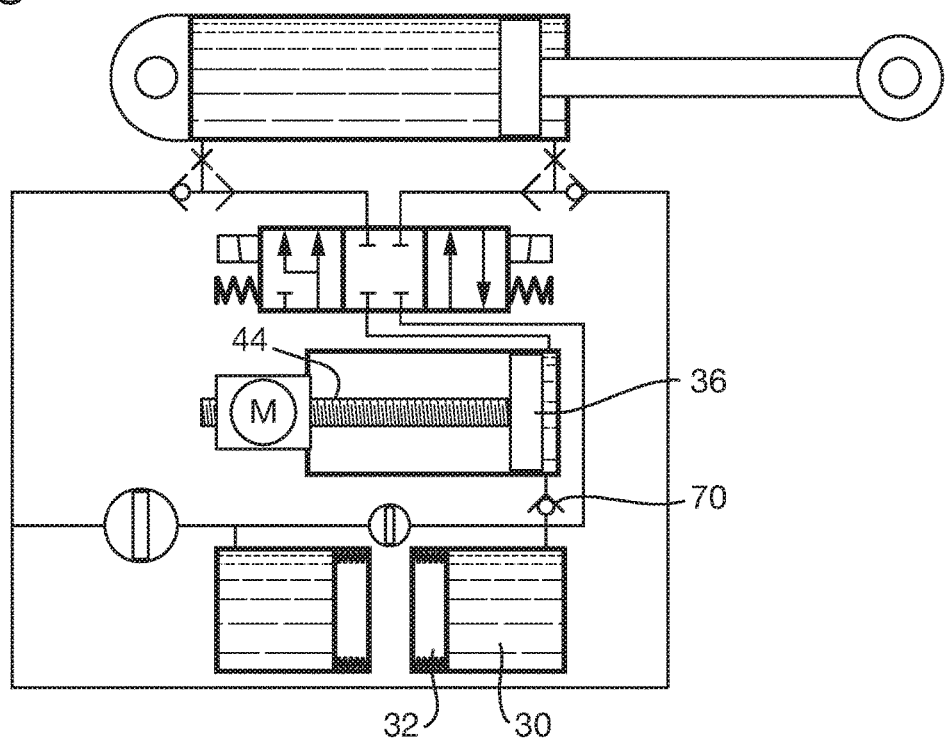

At step s108, the motor 42 of the motor assembly 22 is used to drive the lead screw 44 in an inward direction into the motor assembly cylinder 34, thereby pushing the floating piston 36 against the hydraulic fluid in the motor assembly cylinder 34 thereby transferring the hydraulic fluid in the motor assembly cylinder 34 into the accumulator cylinder 30 via the check valve 70 (this fluid compressing the bellows 32) thereby recharging the accumulator cylinder 30. When the hydraulic pressure in the accumulator cylinder 30 has reached a pre-determined level, the pressure switch (not shown) of the accumulator cylinder 30 signals the motor 42 to stop driving the lead screw in the inward direction (and instead, to thereafter commence the retreat motion described below as part of step s110). The motor 42 may be a relatively small motor i.e. of relatively low power, and this recharging process may take place relatively slowly, over a relatively large time period, for example taking longer than one minute, even for example taking longer than three minutes. In particular, this recharge time period may be significantly longer than the time taken for the actuator to extend in the course of above described step s104, which may only, for example, take less than thirty seconds, or may even take less than ten seconds (and likewise compared to the time for the actuator retraction step s112 described later below). In overview, step s108 may be summarised as performing relatively slow accumulator recharge using a relatively low powered motor. (However, in other embodiments, a larger powered motor may be used, and accumulator recharge may be performed more quickly). The resulting state of the hydraulic actuator system 101 is shown in FIG. 15.

Figure 16:
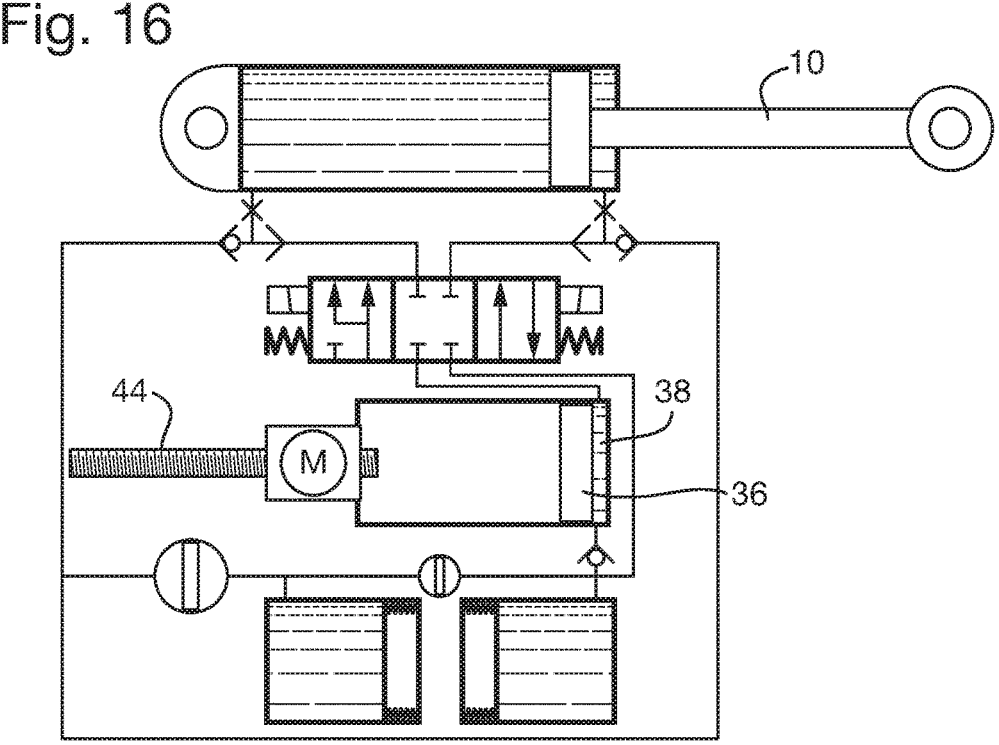

At step s110, the motor 42 retracts the lead screw 44 in an outward direction inside the motor assembly cylinder 34 until the second retract switch 84 stops the retraction of the lead screw 44 when the end of the lead screw 44 reaches the second retract position 85, to thereby leave the floating piston 36 in floating mode. Accordingly, the hydraulic actuator system 101 is put in in a state that is ready for retraction of the actuator i.e. ready for retraction of the piston rod 10. In overview, step s110 may be summarised as resetting the lead screw 44 thereby making the hydraulic actuator system 101 ready for retraction. The resulting "ready for retraction" state of the hydraulic actuator system 101 is shown in FIG. 16.

At step s112, the three position valve 24 is moved to the earlier described second open position 54. Consequently the bellows 32 of the accumulator assembly 20 extend and hydraulic fluid flows in the hydraulic circuit 28 with a net effect of flowing from the accumulator cylinder 30 via the three position valve 24 to the piston rod side 18 of the cylinder barrel 6, and from the bottom chamber 16 of the cylinder barrel 6 via the three position valve 24 to the charging chamber 38 of the accumulator assembly 20. As a result, the piston rod 10 of the linear hydraulic actuator 2 retracts, and also the floating piston 36 of the accumulator assembly 20 is repositioned at the end of the retracted lead screw 44, i.e. at the second retract position 85. In overview, step s112 may be summarised as the three position valve 24 being moved to a retract position (the second open position 54) thereby leading to retraction of the actuator under charge pressure. The resulting state of the hydraulic actuator system 101 is shown in FIG. 17.

At step s114, the three position valve 24 is moved to the earlier described closed position 50. In overview, step s114 may be summarised as the three position valve 24 being reset to neutral position. The resulting state of the hydraulic actuator system 101 is shown in FIG. 18.

At step s116, the motor 42 of the accumulator assembly 20 is used to drive the lead screw 44 in an inward direction into the motor assembly cylinder 34, thereby pushing the floating piston 36 against the hydraulic fluid in the motor assembly cylinder 34 thereby transferring the hydraulic fluid in the motor assembly cylinder 34 into the accumulator cylinder 30 via the check valve 70 (this fluid compressing the bellows 32) thereby recharging the accumulator cylinder 30. As stated above, the motor 42 may be a relatively small motor i.e. of relatively low power, and this recharging process may take place relatively slowly, over a relatively large time period, for example taking longer than one minute, even for example taking longer than three minutes. In particular, this recharge time period may be significantly longer than the time taken for the actuator to extend in the course of above described step s104, which may only, for example, take less than thirty seconds, or may even take less than ten seconds and likewise compared to the time for the actuator retraction step s112 also described above). In overview, step s116 may be summarised as performing relatively slow accumulator recharge using a relatively low powered motor. (However, as stated above, in other embodiments, a larger powered motor may be used, and accumulator recharge may be performed more quickly). Furthermore, in this embodiment, as a result of implementing step 116, the hydraulic actuator system 101 is now in a state that is ready for extension of the actuator i.e. ready for extension of the piston rod 10. This "ready for extension" state of the hydraulic actuator system 101 is the same state as described at step s102 and already shown in FIG. 11, i.e. the hydraulic actuator system 101 is back at the FIG. 11 state of its cyclic operational capability, and accordingly any or all of steps s104 to s116 may be repeated if desired.

As mentioned above, in this embodiment an optional emergency actuation process is provided using the above described optional emergency assembly 26, as described in the following two paragraphs. However, this need not be the case, and in other embodiments the optional emergency assembly is not included in the hydraulic actuator system 101. In yet further embodiments, an emergency assembly is provided, however it is of a different arrangement to that described below.

FIG. 19 shows the hydraulic actuator system 101 implementing the optional emergency assembly 26 in order to carry out an emergency extension of the actuator. The emergency extend valve 66 is activated to allow the emergency bellows 64 to expand thereby pushing the hydraulic fluid in the emergency cylinder 60 from the emergency cylinder 60 into the bottom chamber 16 of the cylinder barrel 6, flow through the first shuttle valve 72 taking place due to the additional hydraulic pressure. As a result, the piston rod 10 of the linear hydraulic actuator 2 extends. An advantage of the above described hydraulic actuator system 1 is that it further optionally allows the emergency assembly 26 to be rechargeable (although this does not need to be the case in other embodiments).

FIG. 20 shows the hydraulic actuator system 101 implementing such an optional recharge of the optional emergency assembly 26 having previously performed the emergency extend process described in the preceding paragraph. The emergency extend valve 66 is returned to closed position, and the emergency charge valve 80 is opened. Then, in a process step analogous to step s108 described earlier above, the motor 42 of the accumulator assembly 20 is used to drive the lead screw 44 in an inward direction into the motor assembly cylinder 34, thereby pushing the floating piston 36 against the hydraulic fluid in the motor assembly cylinder 34 thereby transferring the hydraulic fluid in the motor assembly cylinder 34 into the emergency cylinder 60 via the check valve 70 and the now open emergency charge valve 80 (this fluid compressing the emergency bellows 64) thereby recharging the emergency cylinder 60. When the hydraulic pressure in the accumulator cylinder 30 has reached a pre-determined level, the pressure switch (not shown) of the emergency cylinder 60 signals the motor 42 to stop driving the lead screw in the inward direction. The resulting state of the hydraulic actuator system 101 is shown in FIG. 15. Thereafter, the charge valve 80 is returned to closed position, leaving the hydraulic actuator system 101 in the same state as that at the end of step s108 as described above i.e. in the same state as that shown in FIG. 15.

An advantage of the above described embodiments is that, whilst nevertheless only requiring relatively low powered motors (due to the approach of charging the accumulator over a time span greater than the operating time of the actuator), single modular hydraulic actuators can be provided, rather than one large overall hydraulic circuit, and thus servicing or replacement of individual actuators can be reduced in complexity due to avoiding or alleviating the need to to bleed, flush and replenish the whole hydraulic circuit. Furthermore, the aspect of charging the accumulator over a time span greater than the operating time of the actuator is acceptable for many applications, for example deployment of landing gear where an "up" request would not normally be followed by a "down request" and vice versa, aircraft door opening/closing, and so on. As mentioned above, further particular advantages that tend to be provided by the embodiment shown in FIG. 11 include the possibility of providing a rechargeable emergency operation system. Another advantage that tends to be provided by the embodiment shown in FIG. 11 is that the volume requirement of the accumulator cylinder 30 is reduced by the way the extend command is ported having been changed (compared, as it were, to the embodiment shown in FIG. 1). By directing pressure to both sides of the piston on extend, the resultant force is proportional to the difference in the piston's area from the piston rod side to the extend side. Consequently, the force upon extend is reduced but is more in line with the retract capability. In comparison, the embodiment of FIG. 1 uses a larger accumulator to develop maximum extend thrust and needs a larger accumulator volume to achieve this.

It will be appreciated that in other embodiments details of individual elements of the above described arrangements may be replaced by alternative elements providing equivalent effects. For example, one or more of the various bellows described in the above embodiments may be replaced by alternative compression and/or energy storing means and/or pressure exerting means and/or hydraulic fluid flow control means, for example springs. Where appropriate, additional pistons and the like may be used in association with such alternative means. Also, in other embodiments, elements such as pistons and so on may be omitted if the use of one or more alternative compression and/or energy storing means and/or pressure exerting means and/or hydraulic fluid flow control means renders one or more existing pistons and so on redundant or less desirable. Similarly, in other embodiments, one or more of the above described valves, and/or pressure switches and/or position switches may be omitted or modified with either resulting diminished performance or efficiency, or in other cases, no diminution of performance, for example if alternative elements and arrangements are provided. Also, any cylinders may be replaced by alternative shaped chambers. In yet further embodiments, the details of the linear hydraulic actuator may be changed, by use of other forms of hydraulic actuator that nevertheless benefit from the remaining details of the above described embodiments of hydraulic actuator systems. In yet further embodiments, alternative switching arrangements are provided instead of the particular three position selector valve apparatus and arrangements used by way of example in the above described embodiments. In yet further embodiments, different forms of the motor assembly 22 are provided compared to those described in the above embodiments. For example, different forms of motor and/or lead screw, or equivalent elements, may be provided. Also, other details, including for example the use of a floating piston, may be varied, by the use of other arrangements that provide the same or at least suitably equivalent effect or capability.

In at least some of the above embodiments, recharging of the accumulator assembly with hydraulic fluid is performed at a relatively slow recharge rate such that the recharge takes longer than the time taken to extend the hydraulic actuator. However, this need not be the case, and in other embodiments, recharging of the accumulator assembly with hydraulic fluid is performed at a relatively slow recharge rate that is lower than the rate at which hydraulic fluid was discharged from the accumulator chamber via the selector valve to the hydraulic actuator to provide (at least in part) the extension of the hydraulic actuator. In yet further embodiments, recharging of the accumulator assembly with hydraulic fluid is performed at a relatively slow recharge rate such that the recharge takes longer than the time taken to extend the hydraulic actuator and also such that the recharge rate is lower than the rate at which hydraulic fluid was discharged from the accumulator chamber via the selector valve to the hydraulic actuator to provide (at least in part) the extension of the hydraulic actuator.

In the above embodiments, the motor assembly comprises a motor, a piston and a charging chamber, where the charging member is in the form of a cylinder. However, this need not be the case, and in other embodiments the charging chamber is other than a cylinder. In yet further embodiments, the motor assembly does not comprise a motor, a piston and a charging chamber, and may instead comprise any component and arrangement that provides a function of recharging the accumulator assembly.

The above described embodiments of hydraulic charging and driving systems, and methods of operating hydraulic systems may be implemented wherever such systems and methods are useful. In particular, plural closed hydraulic charging and driving systems, each as described above, may be implemented in a single apparatus to each provide independent operation to a respective different moveable part of that apparatus. This tends to advantageously allow for each such system to be removed from the apparatus independently of the other systems, for example without the need to drain a common hydraulic circuit affecting more than one moveable part of the apparatus, thereby facilitating ease of replacement or servicing of the individual hydraulic systems and/or their corresponding apparatus parts. The apparatus may be a vehicle, for example an aircraft. In the case of an aircraft, the different moveable parts each operated by a respective different hydraulic system as described above may comprise, for example, landing gear, leading edge devices, trailing edge devices, utility doors, and so on. Accordingly, for example, in an aircraft the hydraulic systems for such uses can be implemented in the convenient form of respective individual so-called "Line Replaceable items".

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A hydraulic charging and driving system (4) for extending and retracting a hydraulic actuator (2), comprising:
    a motor assembly (22), the motor assembly (22) comprising a motor (42), a piston (36) and a charging chamber (38);
    an accumulator assembly (20) comprising an accumulator chamber (30);
    the charging chamber (38) and the accumulator chamber (30) being hydraulically coupled to each other; and
    a selector valve (24); wherein
    the motor assembly (22) is arranged to recharge the accumulator assembly (20) with hydraulic fluid by the motor (42) moving the piston (36) to eject the hydraulic fluid from the charging chamber (38) of the motor assembly (22) into the accumulator chamber (30) of the accumulator assembly (20);
    the accumulator assembly (20) and the selector valve (24) are arranged such that hydraulic fluid in the accumulator chamber (30) discharges via the selector valve (24) into the hydraulic actuator (2) to provide at least a part of an actuation of the hydraulic actuator (2) responsive to the selector valve (24) being switched; and
    the recharging of the accumulator assembly (20) is performed at a relatively slow rate that is slower than the rate at which the accumulator assembly (20) is arranged to discharge when providing the at least part of the actuation of the hydraulic actuator (2).

2. The system according to claim 1, wherein the accumulator assembly (20) comprises a compression means (32) provided within the accumulator chamber (30).

3. A system according to claim 1, further comprising a hydraulic actuator (2) comprising a bottom chamber (16) and a piston-side chamber (18);
    wherein the accumulator assembly (20) is hydraulically coupled to the bottom chamber (16) via a first setting of the selector valve (24) to provide extension of the hydraulic actuator (2).

4. A system according to claim 3, wherein the accumulator assembly (20) is further hydraulically coupled to the piston-side chamber (18), in addition to being hydraulically coupled to the bottom chamber (16), via the first setting of the selector valve (24) to provide extension of the hydraulic actuator (2).

5. A system according to claim 3, wherein the piston-side chamber (18) is hydraulically coupled to the motor assembly (22) via a further setting of the selector valve (24) to provide retraction of the hydraulic actuator (2).

6. A system according to claim 1, wherein the whole of the actuation of the hydraulic actuator (2) is provided by the discharge of the hydraulic fluid from the accumulator chamber (30) via the selector valve (24) to the hydraulic actuator (2).

7. A system according to claim 1, further comprising an emergency assembly (26) arranged to provide at least emergency extension of the hydraulic actuator (2).

8. An aircraft comprising a plurality of separate hydraulic charging and driving systems according to claim 1, each of the systems providing independent operation to a respective different movable part of the aircraft.

9. A method of operating a hydraulic system comprising a hydraulic actuator (2), a selector valve (24), a motor assembly (22), and an accumulator assembly (20) hydraulically coupled in a hydraulic circuit (28), the motor assembly (22) comprising a motor (42), a piston (36) and a charging chamber (38), the accumulator assembly (20) comprising an accumulator chamber (30), the charging chamber (38) and the accumulator chamber (30) being hydraulically coupled to each other via a part of the hydraulic circuit (28); the method comprising:
    hydraulically extending the hydraulic actuator (2), the hydraulic extension being provided at least in part by hydraulic fluid being discharged from the accumulator chamber (30) via the selector valve (24) to the hydraulic actuator (2) responsive to the selector valve (24) being switched; and
    thereafter, recharging the accumulator assembly (20) with hydraulic fluid at a relatively slow recharge rate such that the recharge takes longer than the time taken to extend the hydraulic actuator (2), the recharging being performed by the motor (42) moving the piston (36) to eject hydraulic fluid from the charging chamber (38) of the motor assembly (22) into the accumulator chamber (30) of the accumulator assembly (20).

10. A method according to claim 9, wherein the step of hydraulically extending the hydraulic actuator (2) is performed by hydraulically coupling the accumulator assembly (20) to a bottom chamber (16) of the hydraulic actuator (2) by setting the selector valve (24) to a first setting.

11. A method according to claim 10, wherein the step of hydraulically extending the hydraulic actuator (2) is performed by, in addition to hydraulically coupling the accumulator assembly (20) to a bottom chamber (16) of the hydraulic actuator (2), also hydraulically coupling the accumulator assembly (20) to the piston-side chamber (18), by setting the selector valve (24) to the first setting.

12. A method according to claim 9, the method further comprising hydraulically retracting the hydraulic actuator (2).

13. A method according to claim 12, the method further comprising, after hydraulically retracting the hydraulic actuator (2), recharging the accumulator assembly (20) with hydraulic fluid via the hydraulic circuit (28) at a relatively slow recharge rate such that the recharge takes longer than the time taken to retract the hydraulic actuator (2).

14. A method according to claim 9, the method further comprising performing at least an emergency extension of the hydraulic actuator (2).

15. A method of operating an aircraft, comprising operating a first moveable part of the aircraft by implementing the method of claim 9 using a first hydraulic system, and operating a second moveable part of the aircraft of the aircraft by implementing the method of claim 9 using a second hydraulic system, the first and second hydraulic systems being two respective closed hydraulic systems.

\* \* \* \* \*